(12) United States Patent
Eckert

(10) Patent No.: US 10,762,590 B2
(45) Date of Patent: Sep. 1, 2020

(54) SYSTEM AND METHOD FOR PROVISIONING DEVICES USING RFID

(71) Applicant: Futurewei Technologies, Inc., Plano, TX (US)

(72) Inventor: Toerless Eckert, Mountain View, CA (US)

(73) Assignee: Futurewei Technologies, Inc., Plano, TX (US)

( * ) Notice: Subject to any disclaimer, the term of this patent is extended or adjusted under 35 U.S.C. 154(b) by 7 days.

(21) Appl. No.: 15/902,522

(22) Filed: Feb. 22, 2018

(65) Prior Publication Data

US 2019/0259118 A1  Aug. 22, 2019

(51) Int. Cl.

| | |
|---|---|
| *G06K 19/00* | (2006.01) |
| *G06Q 50/28* | (2012.01) |
| *G06Q 10/08* | (2012.01) |
| *H04L 9/08* | (2006.01) |
| *H04W 4/35* | (2018.01) |
| *H04L 9/32* | (2006.01) |
| *H04W 4/80* | (2018.01) |
| *G06Q 30/00* | (2012.01) |

(52) U.S. Cl.
CPC .......... *G06Q 50/28* (2013.01); *G06Q 10/083* (2013.01); *H04L 9/0825* (2013.01); *H04L 9/3263* (2013.01); *H04W 4/35* (2018.02); *G06Q 30/018* (2013.01); *H04L 2209/805* (2013.01); *H04W 4/80* (2018.02)

(58) Field of Classification Search
USPC .......... 235/435, 439, 451, 487, 492; 340/10, 340/572
See application file for complete search history.

(56) References Cited

U.S. PATENT DOCUMENTS

| | | | |
|---|---|---|---|
| 2006/0077034 A1* | 4/2006 | Hillier | G06Q 20/32 340/5.61 |
| 2011/0093938 A1* | 4/2011 | Asokan | G06F 21/31 726/7 |
| 2012/0044060 A1* | 2/2012 | Matsubara | G06Q 10/00 340/10.51 |
| 2014/0306806 A1* | 10/2014 | Martinez de Velasco Cortina G06K 7/10366 340/10.1 |

\* cited by examiner

*Primary Examiner* — Matthew Mikels
(74) *Attorney, Agent, or Firm* — Vierra Magen Marcus, LLP

(57) ABSTRACT

A system and method for provisioning secure devices onto a network are provided. The system includes a voucher server configured to provide a vouchers to a logistics device, and a secure pledge device associated with an RFID (Radio Frequency Identifier) chip, wherein the RFID chip comprises the voucher obtained from the voucher server and written to the RFID chip by the logistics device and the voucher is used for provisioning the pledge device to a customer network.

16 Claims, 13 Drawing Sheets

SYSTEM AND METHOD FOR PROVISIONING DEVICES USING RFID

FIELD OF THE INVENTION

The present disclosure is related to systems and methods for provisioning computing devices onto networks. More particularly, the present disclosure relates to systems and methods for more efficiently and securely provisioning computing devices onto organization computer networks using RFID (Radio Frequency Identifier).

BACKGROUND OF THE INVENTION

For large organizations with hundreds or thousands of computers, network switches, mobile devices, and so on, configuring each device individually to operate securely on the organization network is inefficient and burdensome on the IT staff of the organization. Zero touch bootstrap is a procedure by which new devices are configured to operate on an organization's computer network automatically. In general, and as used herein, bootstrapping refers to processes which a computing device conducts automatically upon power up or reset of the device. There are two IETF working groups that define secure zero touch bootstrap solutions for any type of device. One is ANIMA (Autonomic Networking Integrated Model and Approach) and the other is NETCONF (Network Configuration Protocol). In both systems, a new device is referred to as a "pledge". The pledge is secured by a cryptographic object called a voucher. The voucher contains data such as, but not limited to, a pledge ID, a customer Public Key Infrastructure (PKI) certificate, and a signature of the vendor PKI certificate. ANIMA defines an end-to-end protocol from vendor server to customer server and finally to the pledge. However, ANIMA requires interaction between the organization desiring to configure the device and the device vendor's server, which can be an operational challenge, for example, because of the network connectivity required. NETCONF only specifies a protocol from the customer's server to the pledge. To date, vouchers have been delivered via Universal Serial Bus (USB) stick, or the like, but this is problematic. The USB stick must be delivered together with, or be matched up with, the correct device.

SUMMARY OF THE INVENTION

Accordingly, there is a need for organizational networks to provision equipment efficiently, and without requiring an internet communication outside of the organization to a vendor service. This may be for security or because of a lack of internet availability. Military organizations, building networks, and industrial organizations, among others, could benefit from an improved network provisioning system.

The disadvantages of the current solutions mentioned in the background are overcome and other advantages are realized according to exemplary embodiments of the disclosure, which describe a system for provisioning secure devices onto a network. The system includes a voucher server for providing vouchers to the logistics device, and a secure pledge device comprising an RFID chip that stores a voucher obtained from the voucher server and written to the RFID chip by the logistics device.

The present disclosure provides a system for provisioning secure devices, comprising a voucher server configured to provide a vouchers to a logistics device, and a pledge device associated with an RFID (Radio Frequency Identifier) chip, wherein the RFID chip comprises the voucher obtained from the voucher server and written to the RFID chip by the logistics device and the voucher is used for provisioning the pledge device to a customer network.

Optionally, the system further comprises a logistics server comprising logistics information related with the pledge device, wherein the logistics information comprises at least one of a crypto anchor (CA), a customer ID or a pledge serial number.

Optionally, the logistics device obtains the logistics information from the logistics server, and writes the logistics information to the RFID chip.

Optionally, the RFID chip is embedded in the pledge device or is provided on packaging of the pledge device.

Optionally, the voucher is generated by the voucher server based on the logistics information related with the pledge device.

Optionally, the voucher is generated using a customer root certificate.

The present disclosure also provides a logistics device, comprising a network interface configured to send or receive information from a voucher server; an RFID (Radio Frequency Identifier) scanner/writer configured to write a voucher to an RFID chip associated with a pledge device, wherein the voucher is obtained from the voucher server is used for provisioning the pledge device to a customer network.

Optionally, the logistics device further comprises a barcode scanner configured to read a serial number of the pledge device.

Optionally, the logistics device further comprises an antenna configured to wirelessly communicate with the voucher server.

The present disclosure also provides a method of provisioning secure pledge devices, comprising receiving a voucher from a voucher server; writing the voucher to an RFID (Radio Frequency Identifier) chip associated with a pledge device, wherein the voucher is used for provisioning the pledge device to a customer network.

Optionally, the voucher is written to the RFID chip while the pledge device is powered off.

Optionally, the voucher is written to the RFID chip while the pledge device is packaged for shipment to a customer.

BRIEF DESCRIPTION OF THE DRAWING FIGURES

Exemplary embodiments of the disclosure shall be described in connection with the appended drawings, in which.

Throughout the drawings, like reference numbers should be understood to refer to like elements, features and structures. The figures are drawn to clearly illustrate the relevant aspects of the embodiments and are not necessarily drawn to scale.

DETAILED DESCRIPTION OF EXEMPLARY EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
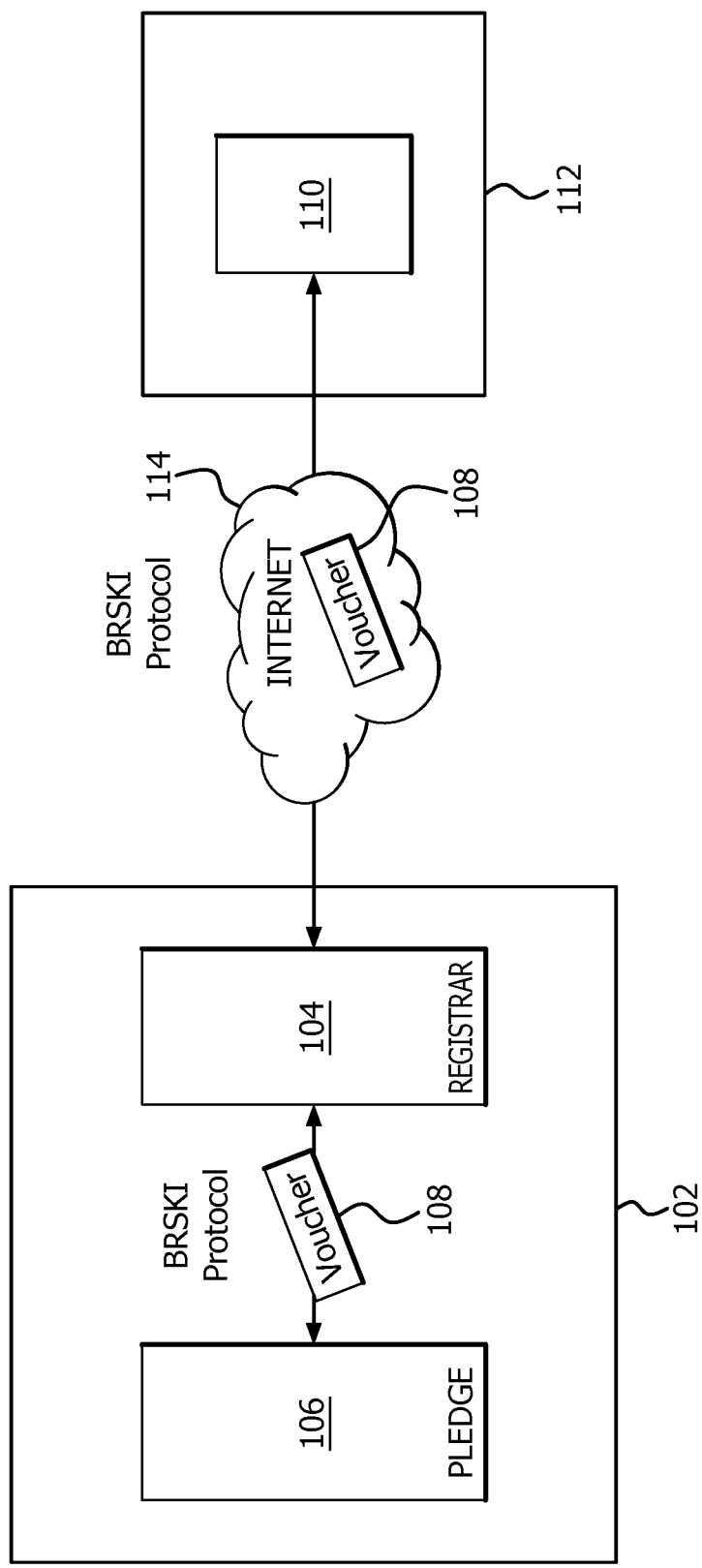
FIG. 1 illustrates a bootstrapping system for provisioning devices onto a network.

FIG. 1 illustrates a bootstrap solution. A customer network 102 includes a registrar 104 and a pledge device 106. The pledge device 106 must obtain a voucher 108 through the registrar 104 in order to join the customer network 102. The registrar 104 must request the voucher 108 from a vendor MASA server 110 located in the vendor's network 112. The voucher 108 typically take the form of a data file containing information that the pledge device 106 supplies to demonstrate that the pledge device 106 is authorized to join the organization's computer network. This means the registrar 104 must communicate over the internet 114 to the vendor's Manufacturer Authorized Signing Authority (MASA) server 110 to obtain the necessary voucher 108. The voucher request and transmittal are handled using the Bootstrapping Remote Secure Key Infrastructure (BRSKI) protocol. ANIMA is an example of this type of bootstrap solution.

Figure 2:
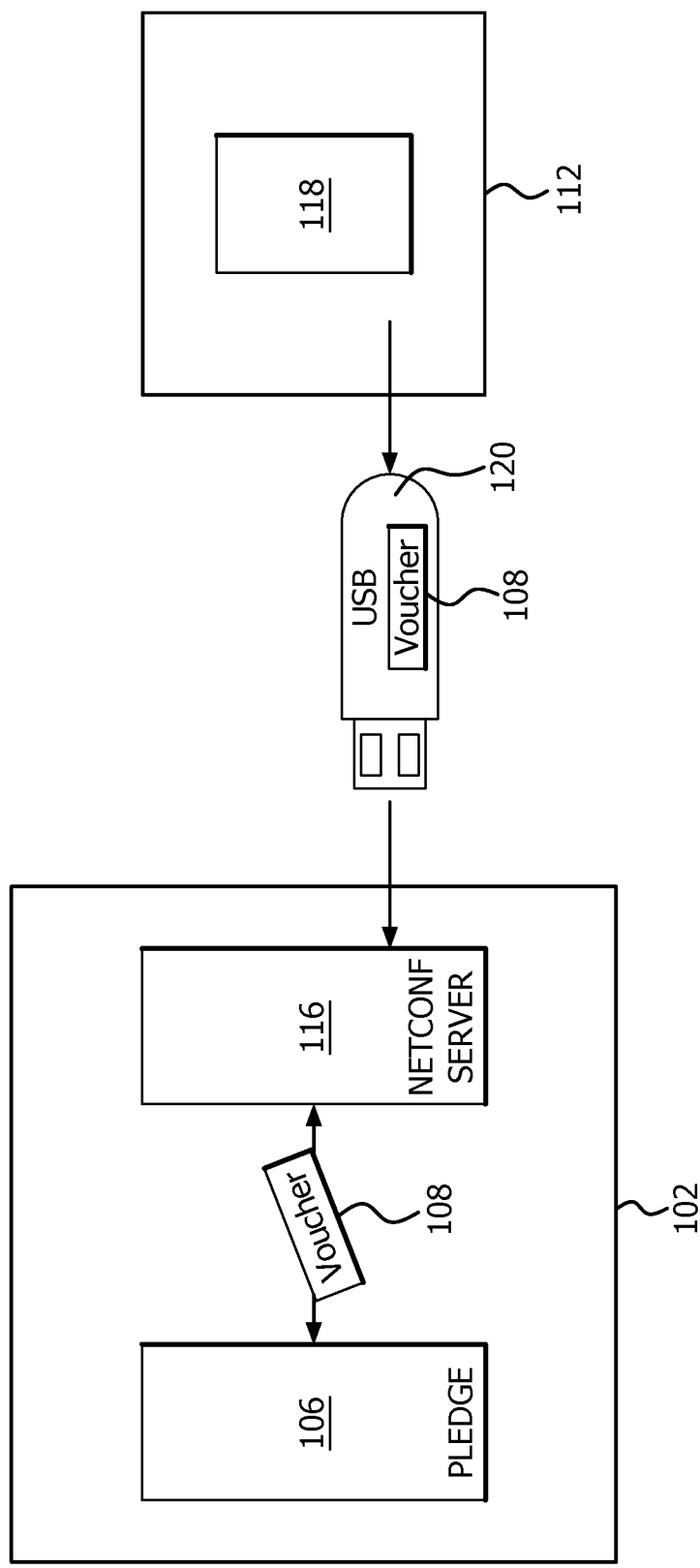
FIG. 2 illustrates another bootstrapping system for provisioning devices onto a network.

FIG. 2 illustrates another bootstrap solution. A pledge device 106 requires a voucher 108 to join a customer network 102, as in the example above. However, instead of using an end-to-end protocol such as BRSKI, the NETCONF protocol does not define how vouchers get to a customer NETCONF server 116. Accordingly, the voucher 108 may be delivered from a vendor server 118 to the customer's NETCONF server 116 via a USB storage device 120, or the like.

Figure 3:
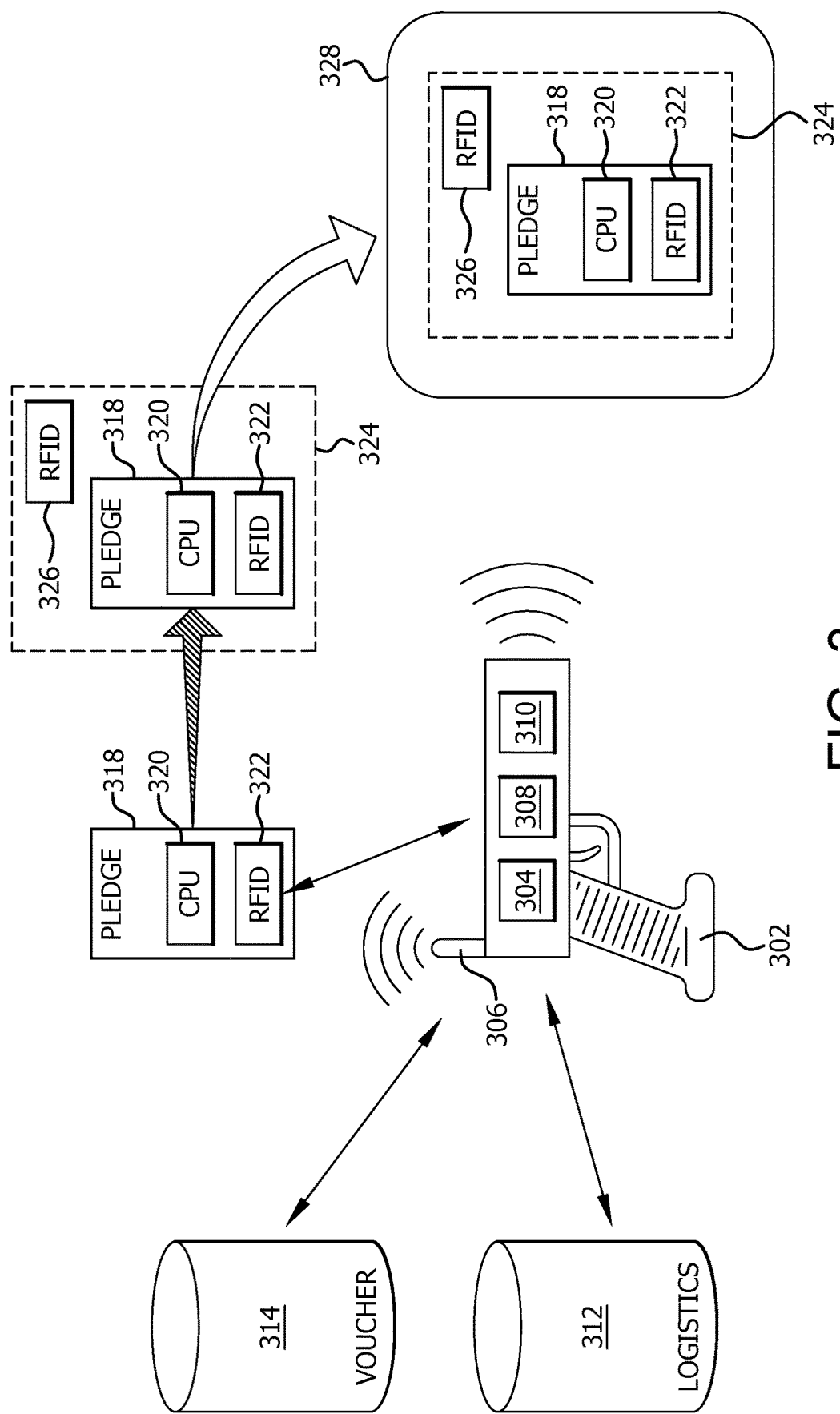
FIG. 3 illustrates an exemplary system for provisioning secure devices onto a network according to an exemplary embodiment of the disclosure.

FIG. 3 illustrates a first embodiment according to this disclosure. This solution preferably includes a handheld logistics device 302 that includes a network interface 304, such as a Wifi wireless interface, although any other suitable network communication interface, whether wireless or wired, could be utilized in the place of Wifi. The logistics device 302 advantageously facilitates manufacture and packaging of computing devices such as pledge device 318 by implement a valid voucher so that when the pledge device 318 is received by an organization, the device may be authenticated and configured to operate on the organization's computer network without requiring network communication or deliver or a separate USB stick, as described above. The device 302 may also include an antenna 306 for the wireless network interface 304. The device 302 includes an RFID scanner/writer 308, and preferably but optionally includes a barcode scanner 310 for reading pledge device serial numbers in preparation for requesting a voucher. Other typical elements such as a user interface and a display are omitted for clarity. The barcode scanner is preferably used during manufacture and packaging to scan a barcode identifying a device serial number associated with the pledge device 318. The logistics device 302 communicates, via the wireless network interface 304 and the antenna 306 or other communication interface, with a logistics server 312, which may be an existing logistics server of a pledge device vendor, for example. The logistics device also communicates, via the wireless network interface 304 and the antenna 306, with a vendor voucher server 314 to obtain vouchers that are generated by the voucher server and then stored on one or both RFID chips 322/326. The vouchers are preferably based on the pledge device serial number obtained by the logistics device 302. Pledge device 318 includes a Central Processing Unit (CPU) 320, and includes an RFID chip 322, which may be incorporated into the CPU 320, or otherwise incorporated into the electronics of the pledge device 318. After manufacture, the pledge device 318 is packaged into packaging 324. Although manufacturing and packaging is described as being performed by one entity, those of ordinary skill in the art will appreciate that one entity may manufacture pledge devices, and another entity my package the pledge devices for shipment to customers. Packaging 324 may also includes an RFID chip 326. The system according to this embodiment may use either or both of the RFID chips 322 and 326 to store the voucher. During manufacturing and packaging, the logistics device 302 is used to obtain a voucher for the pledge device 318 from voucher server 314, and to write the voucher to the RFID chip 322 and/or 326, for delivery to a customer together with the pledge device 318. The pledge device 318 is delivered together with the voucher stored on one or both RFID chips 322/326 to a reseller or shipped to the destination organization 328. In this manner, the pledge device 318 is advantageously delivered to a customer, and can be boostrapped to the customer network using the voucher delivered in the RFID chip 322 and/or 326. This system with minimal additional overhead to existing logistics avoids the need for the customer network to communicate over the internet in order to provision the pledge device 318 onto the customer network, and avoids the complexity involved with shipping a voucher stored on a USB drive which must be associated with the pledge device by the customer.

Figure 4:
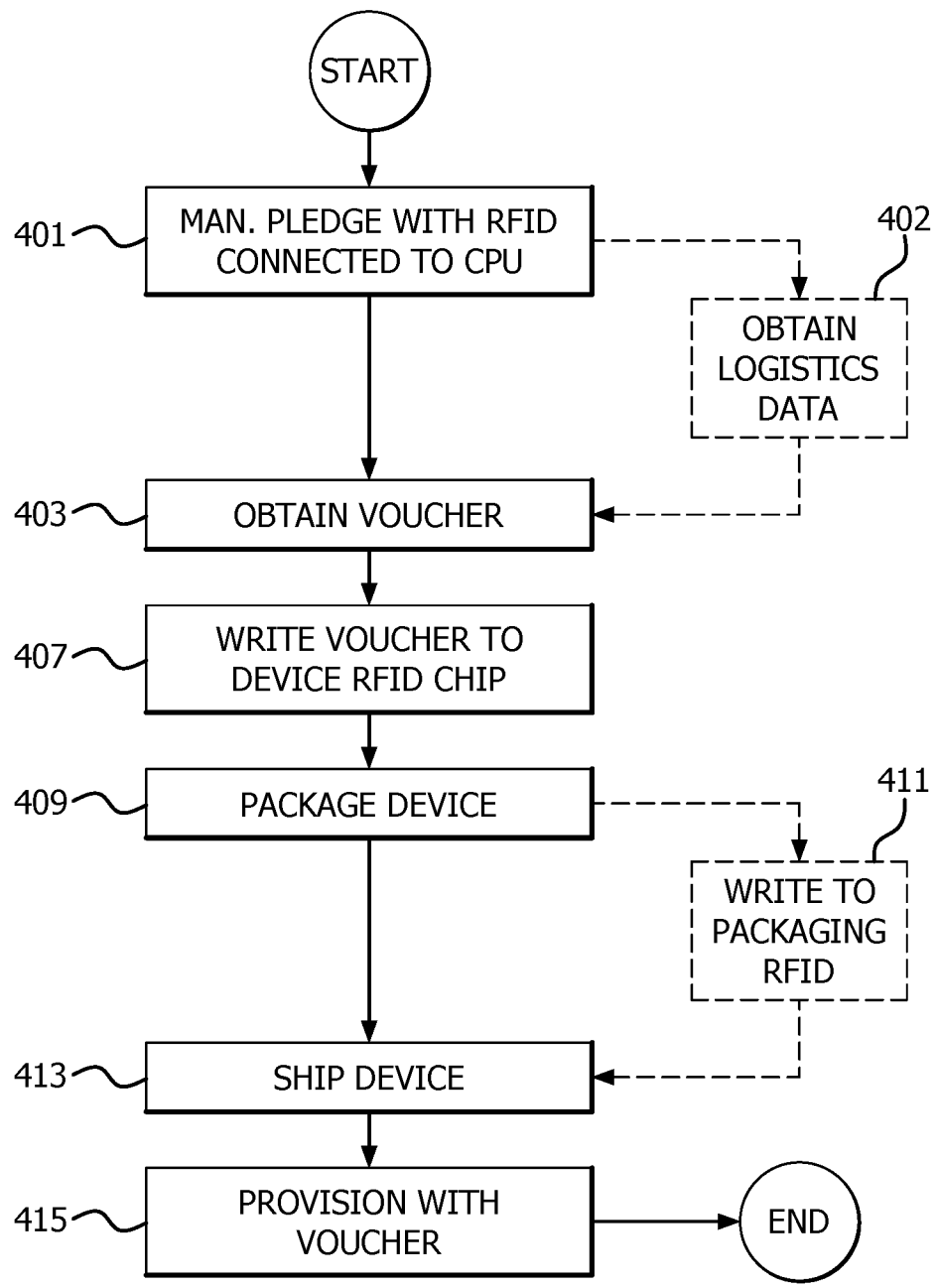
FIG. 4 illustrates an exemplary method for provisioning secure devices onto a network according to an exemplary embodiment of the disclosure.

FIG. 4 is a flowchart of a workflow for provisioning devices to a customer network according to an exemplary embodiment of this disclosure. At step 401, a pledge device is manufactured with a CPU having an RFID chip inside or coupled to the CPU. At step 402, the logistics device optionally communicated with a logistics server 312 to obtain information necessary to, or in support of, obtaining a voucher. This information may include, by way of example, the customer identity and the pledge device serial number. At step 403, a logistics device, such as device 302 described above, requests and obtains a voucher generated by a voucher server 314 via wireless or wireline communication. The method proceeds to step 407, where the logistics device writes the voucher to the RFID chip of the pledge device, for example, via the RFID scanner/writer 308. Next, at step 409, the device is packaged. Optionally, at step 411, the packaging may also include an RFID chip, and the voucher is written to the packaging RFID chip. At step 413 the device is shipped, and eventually delivered to a customer. At step 415, the device is provisioned onto the customer network with the voucher delivered on the RFID chip. As will be described in further detail below, during bootstrapping of the pledge device, the voucher is used to authenticate the pledge device, and the pledge device is then configured to operate on the computer network of the organization if the voucher passed the authentication.

Figure 5:
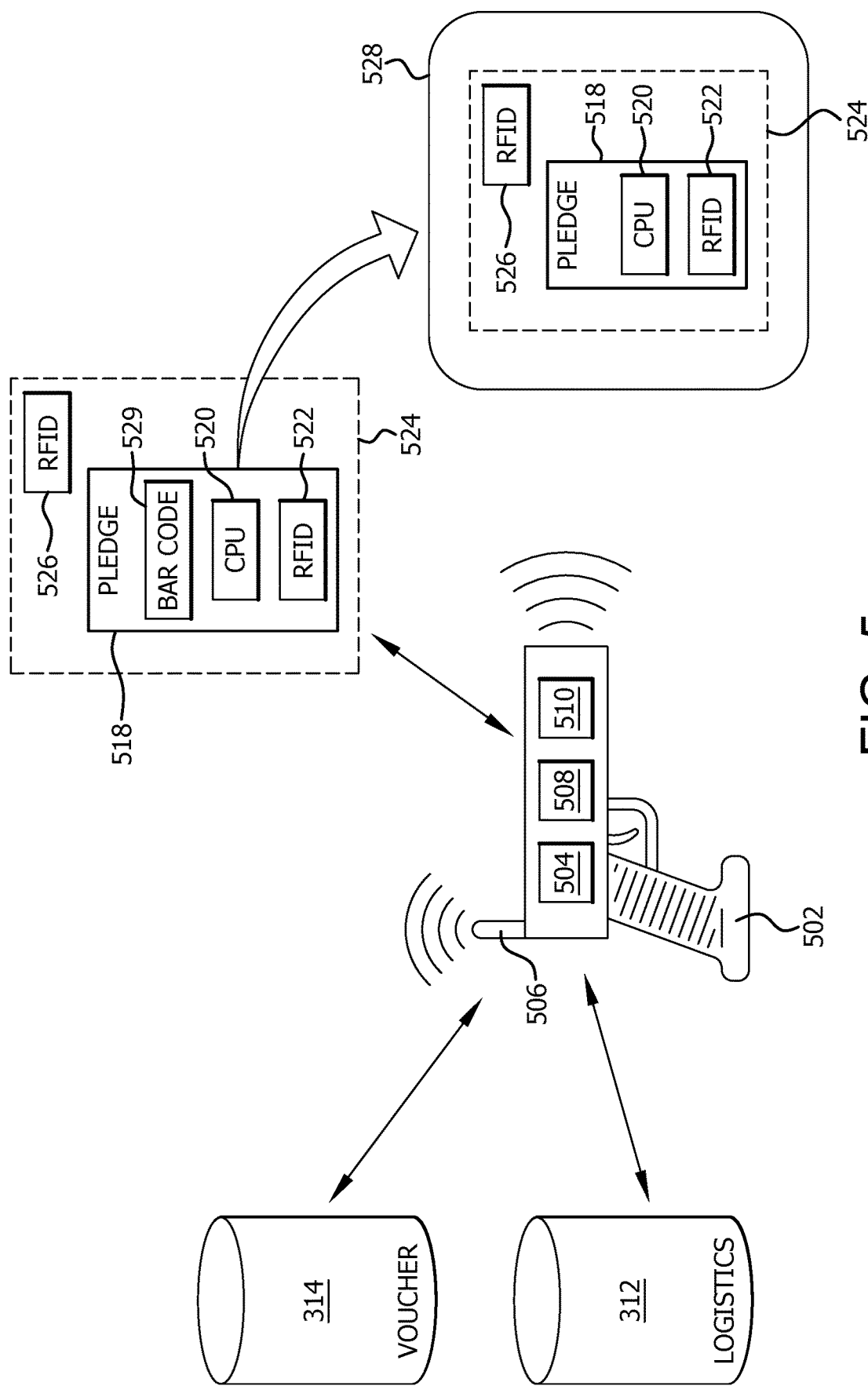
FIG. 5 illustrates an exemplary system for provisioning secure devices onto a network according to a second exemplary embodiment of the disclosure.

FIG. 5 illustrates a second embodiment according to the present disclosure. The embodiment of FIG. 5 is similar to the embodiment described in connection with FIG. 3, with key differences explained herein. In this system, the pledge device 518 is preferably packaged in packaging 524 and powered off. An RFID chip 522 or 528 is preferably coupled to or incorporated into the CPU 520 of the pledge device 518. Logistics device 502, which is preferably a wireless handheld device having antenna 506, preferably comprises a network interface 504 which is preferably a wireless network interface, an RFID reader/writer 508, and optionally a barcode reader 510. Using the logistics device 502, a pledge device 518 is associated with a customer, and thereby secured such that only the customer can use the device. The logistics device 502 reads serial number information from the pledge device 518. This information may be provided in the RFID chip, or alternately by a barcode 528 provided on the pledge device 518 or on the packaging 524. The logistics device 502 further obtains a customer ID associated with the pledge device 518 from the logistics server 312. The logistics device sends the serial number of the pledge device 518 together with the customer ID to a voucher server 314. As will be described below in further detail, the voucher server contains root certificate information for the customer associated with the customer ID. The root certificate for the customer is cryptographic information which enables the voucher server to generate vouchers specific for the intended customer. With the root certificate information, the voucher server 314 generates a voucher that can only be used by the customer. The voucher server returns a voucher, and the logistics device 518 writes the voucher to the RFID chip 522 or 526 by the RFID reader/writer 508. Advantageously, the above described process can occur while the pledge device is packaged and powered off, since RFID technology permits the logistics device 502 to write to the RFID chips 522 and/or 526 without the chips being separately powered, and without the pledge device being powered. Also advantageously, so long as the RFID chip 522 or 526 is within a distance range of the logistics device 502, typically 50 cm to 1 m, the logistics device 502 can read from and write to the RFID chip. The above described process can advantageously occur during manufacturing, after manufacturing but during shipment to the customer, or during shipment from a reseller, or any other convenient time before or after the pledge device is packaged.

The device may be stored for any amount of time, because the voucher information is secure and robust in the RFID chip. When the customer receives the pledge device 518, they power it on, and during boot up, the pledge device obtains a certificate derived from the customer root certificate, which enables the device to be authenticated only by the customer. As will be appreciated by those of ordinary skill in the art, any suitable zero-touch bootstrap protocol may be used in conjunction with this voucher and provisioning system.

Figure 6:
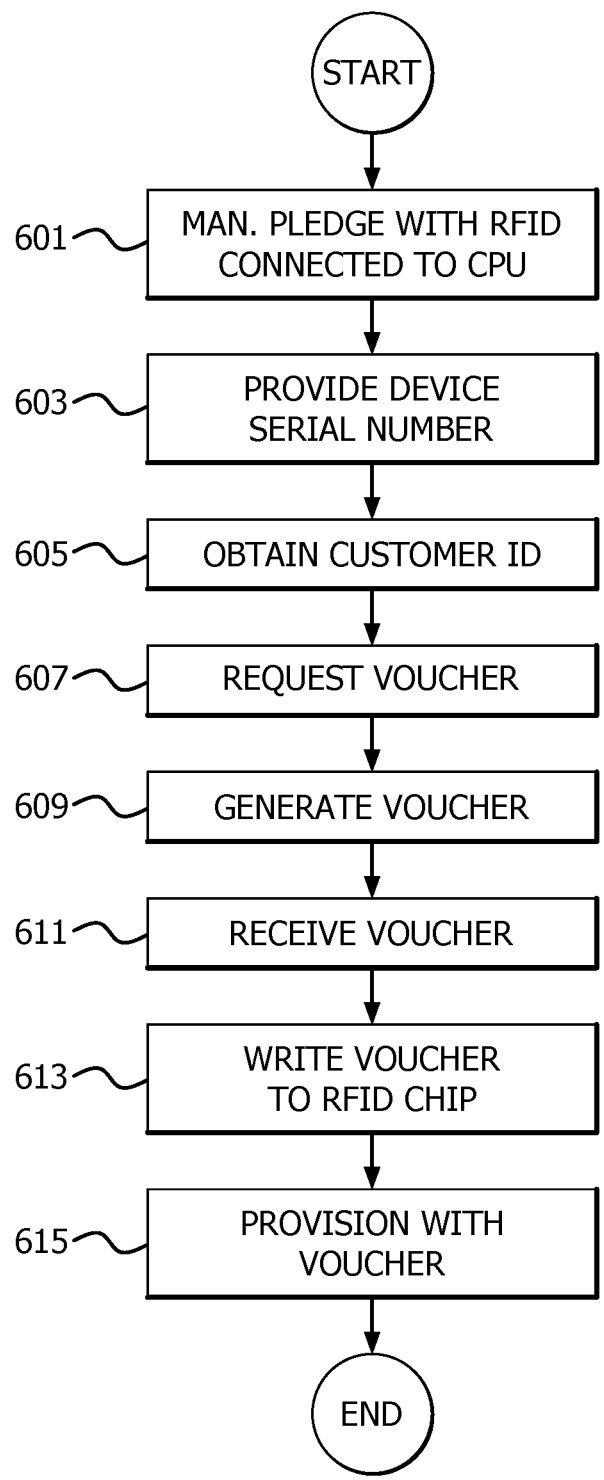
FIG. 6 illustrates a second exemplary method for provisioning secure devices onto a network according to an exemplary embodiment of the disclosure.

FIG. 6 illustrates a second method according to an exemplary embodiment. At step 601 the pledge device is manufactured with an RFID chip incorporated or connected to the processing unit (CPU) of the pledge device. At step 603, a serial number of the pledge device is provided in a barcode or the RFID chip. At step 605, the customer ID is obtained from a logistics server. At step 607, the logistics device sends the serial number and customer ID to a voucher server and requests a voucher. At step 609 the voucher server generates a voucher based on the serial number of the pledge device and the customer ID. At step 611, the logistics device receives the voucher from the voucher server. At step 613 the logistics device writes the voucher to the RFID chip. Finally, at step 615, the pledge device undergoes provisioning with a zero-touch bootstrap process that utilizes the voucher to verify the pledge device.

Figure 7:
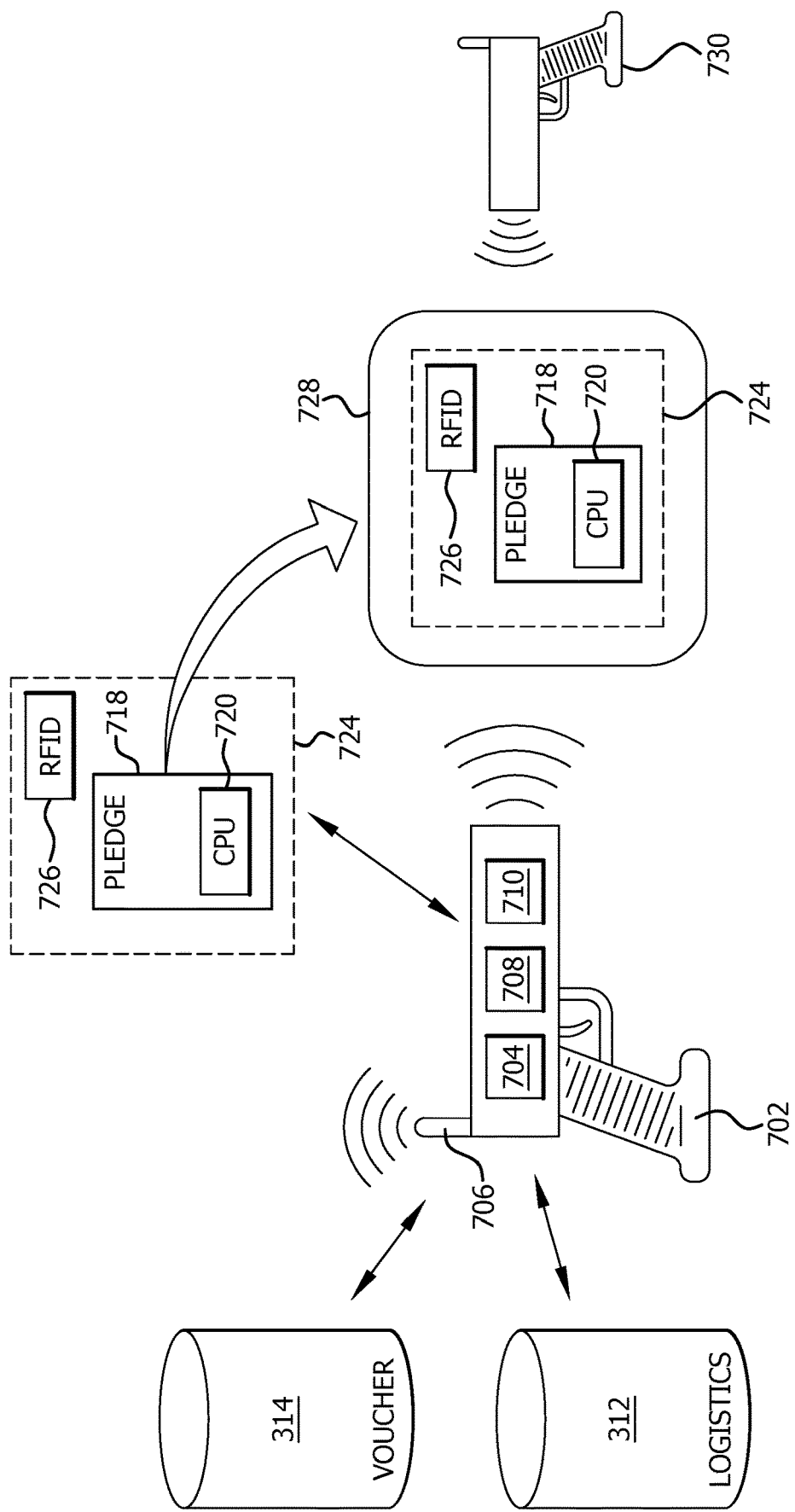
FIG. 7 illustrates an exemplary system for provisioning secure devices onto a network according to a third exemplary embodiment of the disclosure.

FIG. 7 illustrates a third embodiment of the disclosure. This embodiment is similar to the prior two amendments, but addresses a case where an RFID chip is not incorporated into or connected to a central processing unit (CPU) 720 of the pledge device 718. The RFID chip 726 may be incorporated into the packaging 724, or otherwise attached to the pledge device 718. The logistics device 702 obtains a device serial number via barcode or RFID, and a customer ID from a logistics server 312. The logistics device 702 then requests a voucher from a voucher server 314. The voucher server preferably utilizes a customer root certificate associated with the customer ID to generate a voucher. The voucher is sent to the logistics device 702, and then the logistic device 702 writes the voucher to the RFID chip 726. The pledge device 718 in the packaging 724 is delivered to a customer. At the customer premises 724, the customer uses a customer provisioning device 730 to read the voucher from the RFID chip 726. The provisioning device 730 then sends the voucher to a customer server, which may be a conventional registrar, or any other suitable server utilizing a suitable bootstrap protocol.

Figure 8:
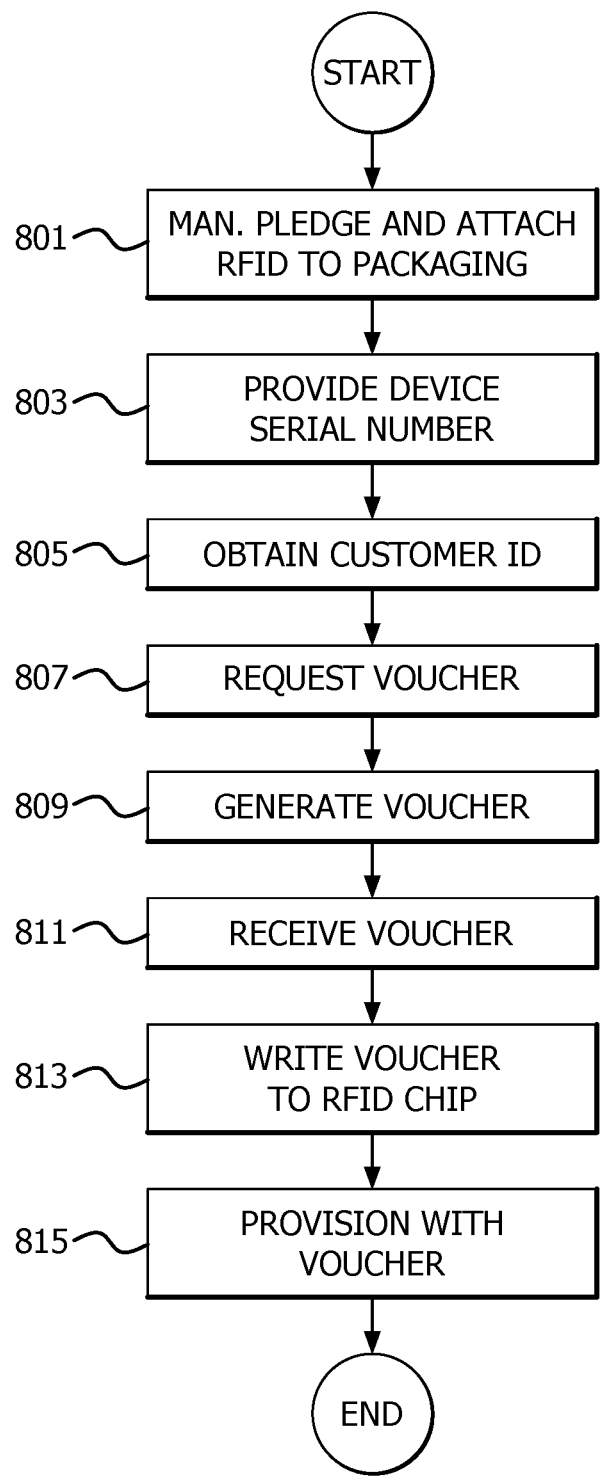
FIG. 8 illustrates a third exemplary method for provisioning secure devices onto a network according to an exemplary embodiment of the disclosure.

FIG. 8 illustrates a third method according to an exemplary embodiment. At step 801 the pledge device is manufactured and an RFID chip is attached to the packaging of the pledge device or otherwise associated with the pledge device so that it is delivered to a customer together with the pledge device. At step 803, a serial number of the pledge device is provided in a barcode or the RFID chip. The serial number of the pledge device is provided in a manner similar to how conventional serial numbers of devices are provided and are well known, and may include for, example, a barcode printed on packaging, or on the device, or an RFID chip with the serial number stored thereon. At step 805, the customer ID is obtained from a logistics server by the logistics device. As will be described in greater detail below, the logistics device reads the device serial number, then sends a request for the customer ID to the logistics server, which returns the customer ID associated with the serial number. At step 807, the logistics device sends the serial number and customer ID to a voucher server and requests a voucher. At step 809 the voucher server generates a voucher based on the serial number of the pledge device and the customer ID. At step 811, the logistics device receives the voucher from the voucher server. At step 813 the logistics device writes the voucher to the RFID chip. Finally, at step 815, the pledge device undergoes provisioning with a zero-touch bootstrap process that utilizes the voucher to verify the pledge device.

Figure 9A:
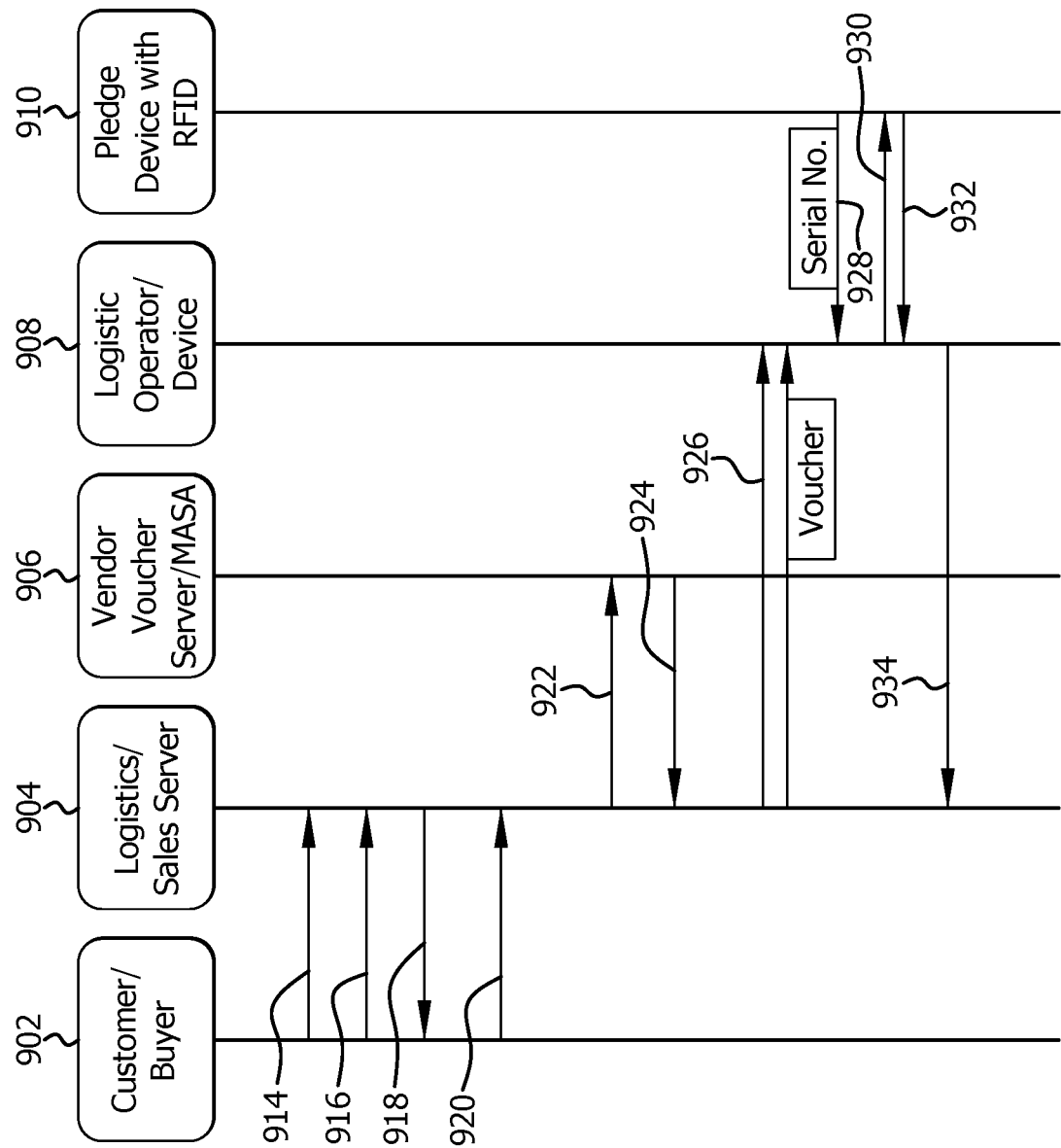
FIG. 9A illustrates a communication flow operable to provision a secure device according to an exemplary embodiments of the disclosure.

FIG. 9A illustrates a communication flow among devices involved in preparing a pledge device for shipment to a customer, according to an exemplary embodiment of the disclosure. Various devices or entities exchange information in order to prepare a pledge device to be delivered from a vendor to a customer. The entities include a customer or buyer 902, a logistics/sales server 904, a vendor voucher server 906, a logistics device 908 which is substantially as described above, and a pledge device with RFID or packaged with RFID 910. The initial communication flow is a precursor to the remaining communication flow, and is only required to happen once to establish a relationship between vendor and customer. The initial communication flow includes a customer 902 establishing a customer account with the vendor by providing necessary information such as credit account information, shipping destination address, and so on, which is stored in a logistics/sales server 904 at step 914. Next, a customer crypto anchor (CCA), such as, for example, a root certificate of the customer, is provided to the logistics/sales server 904 at step 916. Next the customer 904 receives account credentials from the logistics/sales server 904 at step 918. After step 918 is completed, steps 914-918 do not need to be repeated for a given vendor/customer pair, and the customer is ready to order pledge devices from the vendor. The remaining steps to be described below can be repeated as many times as needed.

At step 920, the customer 902 transmit a purchase request to the logistics/sales server 904, to purchase a pledge device. The logistics/sales server 904 locates a pledge device in an inventory database, and determines a serial number of the pledge device, and preferably determines its stock location based on the shipping destination. Next, at step 922, the logistics/sales server requests a voucher from a vendor voucher server 906, such as a MASA server. The request includes transmitting the CCA and the pledge serial number to the vendor voucher server 906. At step 924, a voucher, also known as a vendor crypto anchor (VCA) is returned to the logistics server 904 from the vendor voucher server 906. The voucher is a cryptographic object derived from the CCA of the customer and the pledge serial number. At step 926, an instruction is sent from the logistics/sales server 904 to the logistics device 908 instructing the operator of the logistics device to locate the pledge device in, for example, a warehouse, and ship the pledge device to the customer. The voucher is also transmitted to the logistics device 908 in this step. The logistics device is used to locate and identify the pledge device having the pledge device serial number in the warehouse. This may be accomplished alternately by barcode scanning of pledge device packaging, or reading a serial number from an RFID chip associated with the pledge device or packaging, or any other suitable means. This step is represented as step 928. When the correct pledge device is located, the logistics device 908 writes the voucher to an RFID chip 912 associated with the pledge device 910 at step 930. At step 932, the logistics device 908 read-verifies that the voucher was successfully written to the RFID chip associated or packaged with the pledge device 910. Finally, at step 934, the logistics device 908 notifies the logistics/sales server 904 that the pledge device has been assigned to shipment, and that the voucher has successfully been written to the RFID chip associated with the pledge device. The above described process advantageously does not require any additional steps other than existing logistics processes for pulling inventory and shipping to customers.

Figure 9B:
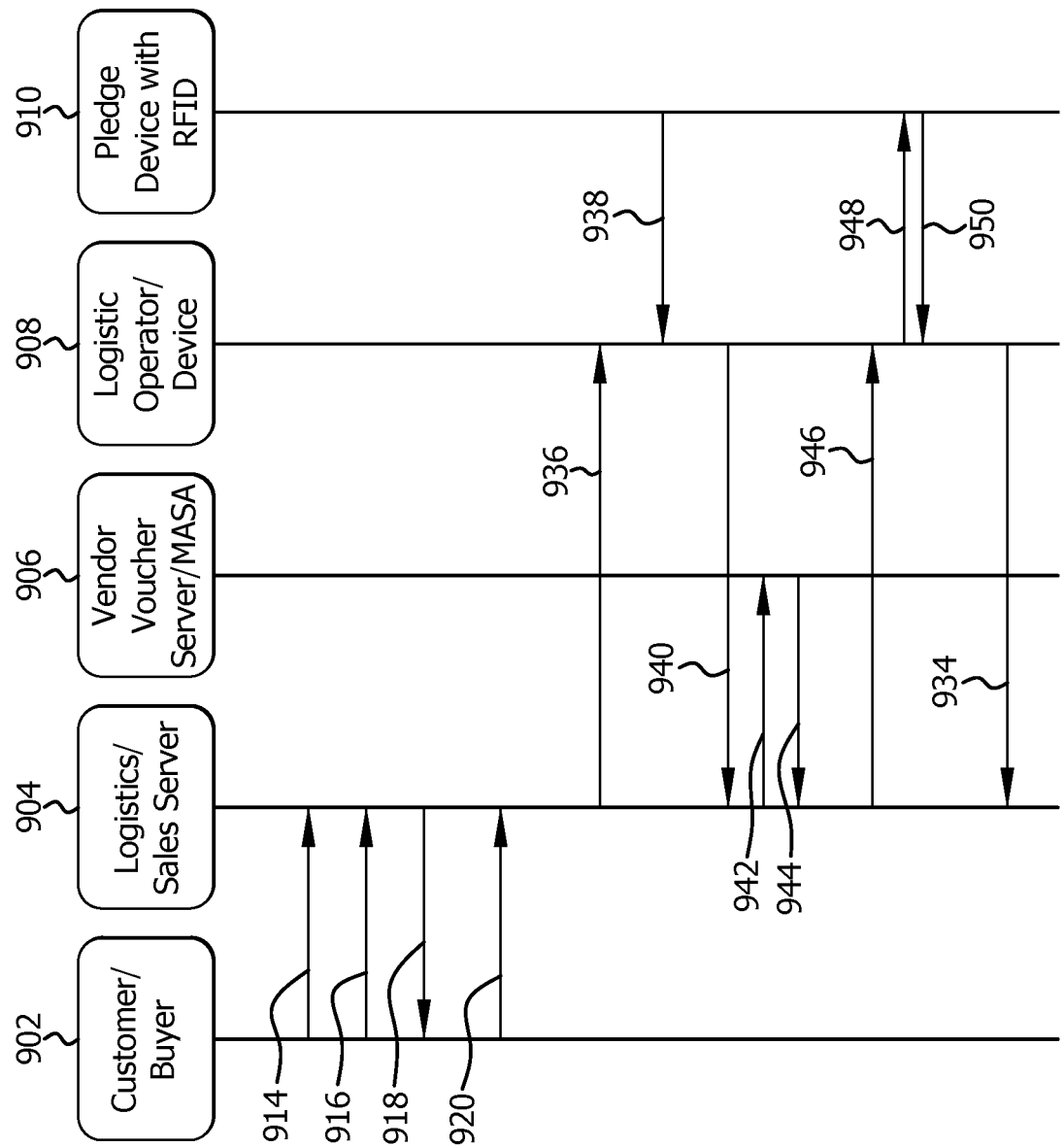
FIG. 9B illustrates a communication flow operable to provision a secure device according to another exemplary embodiments of the disclosure.

FIG. 9B illustrates a communication flow according to another embodiment of the disclosure. This communication flow is substantially similar to the communication flow described above in connection with FIG. 9A, except that after step 920, the logistics/sales server 904 instructs the logistics device 908 to locate a pledge device of a type requested by the customer, as shown in step 936, and the logistics operator locates a pledge device 910 of the correct type and obtains its serial number from an RFID chip or barcode, or the like, at step 938. Next, at step 940, the logistics device 908 sends the serial number of the located pledge device to the logistics/sales server 904. At step 942, the logistics/sales server 904 requests a voucher from the vendor voucher server 906, and transmits the CCA and the pledge serial number to the vendor voucher server 906. The vendor voucher server 906 generates a signed voucher based on the VCA, CCA and pledge serial number and sends it to the logistics/sales server 904, at step 944. At step 946, the voucher is sent from the logistics/sales server 904 to the logistics device 908. The logistics device 908, then writes the voucher to the RFID chip associated with the pledge device 910 to be shipped, at step 948, and read verifies the voucher at step 950. Step 934 is unchanged.

Figure 10A:
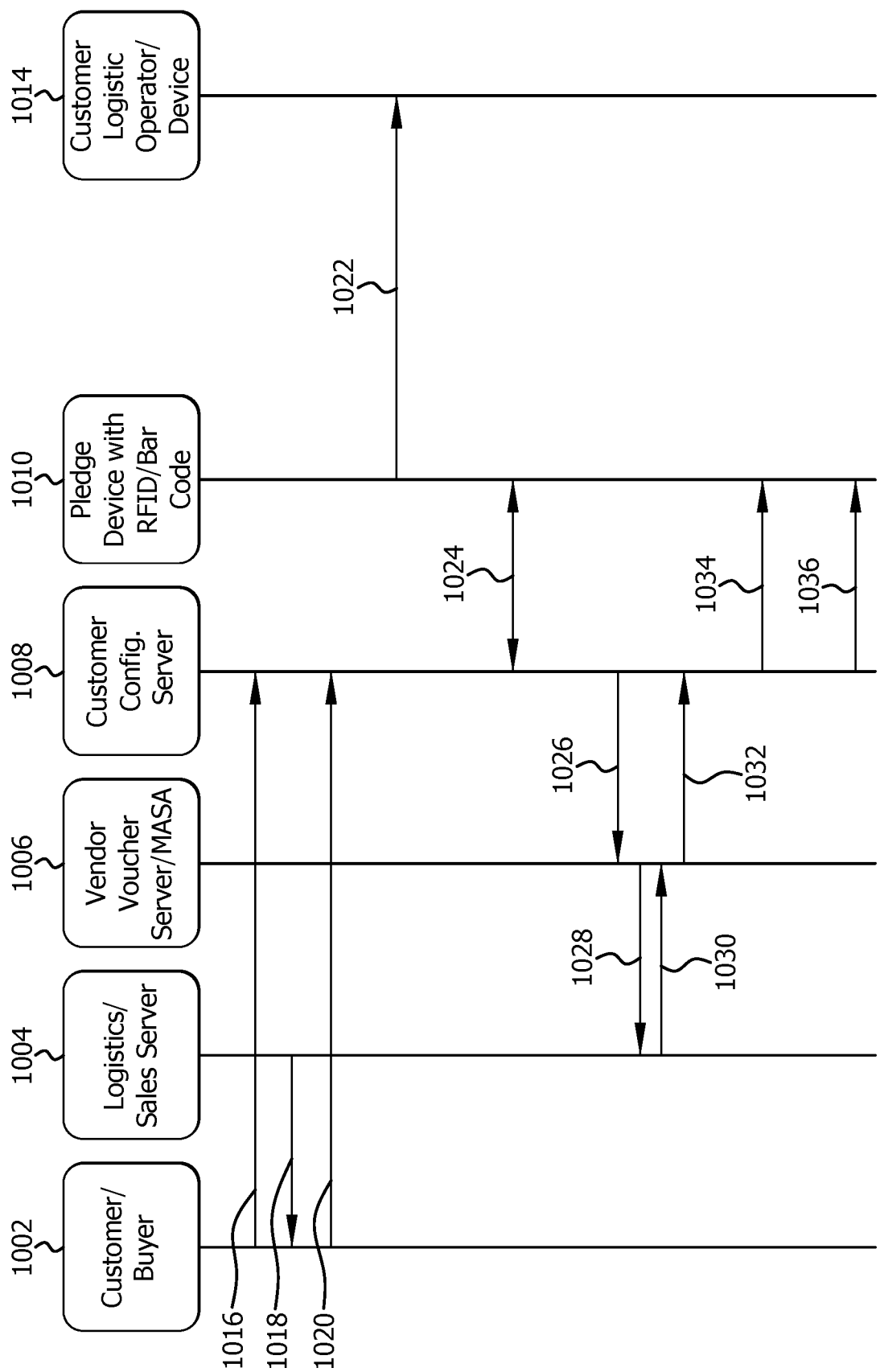
FIG. 10A illustrates a communication flow operable to provision a secure device from a customer perspective according to an exemplary embodiments of the disclosure.

FIG. 10A illustrates a communication flow for a customer receiving and configuring a pledge device according to an exemplary embodiment of the disclosure. The devices which communicate during this process include the customer 1002, a logistics/sales server 1004, a vendor voucher server 1006, such as a MASA server, a customer configuration server 1008, a pledge device 1010, including a pledge identification such as a barcode or RFID chip, and a customer logistics device 1014. The first several steps are a precondition to the remaining steps, and only need to occur once, while the remaining steps occur as many times as needed for each new pledge device received and configured by a customer. At step 1016, a new customer provides their CCA credentials to the configuration server 1008. The logistics/sales server sends access credentials to the customer 1002 at step 1018. Next the customer sends their access credentials to the configuration server 1008 at step 1020. At this point the customer/vendor relationship is established and the customer is ready to begin receiving pledge devices from the vendor.

When a new pledge device is received by the customer from the vendor, the customer reads a barcode or RFID chip on the pledge device with a customer logistics device 1014, at step 1022. Advantageously, this step is most likely one already performed regularly by the customers when receiving articles. At step 1024, the pledge device 1010 and the customer configuration server 1008 discover one another, and the configuration server 1008 receives the serial number of the pledge device 1010. At this stage, the pledge device does not yet trust the configuration server, and cannot yet be configured. At step 1026, the customer configuration server requests a voucher from the vendor voucher server 1006. The request includes the serial number of the pledge device, and the CCA of the customer. Optionally, at step 1028, the vendor voucher server 1006, may send a request to the logistics server 1004, to verify that there is a record of this customer purchasing a pledge device with this serial number. The logistics/sales server 1024 returns verification to the vendor voucher server 1006 at step 1030. At step 1032, the vendor voucher server returns a voucher to the customer configuration server 1008. At step 1034, the configuration server 1008, provides the received voucher to the pledge device 1010. The pledge device 1010 authenticates the keying material based on the received CCA, and determines that the customer configuration server can be trusted. Finally, at step 1036, the trusted customer configuration server 1008 configures the pledge device 1010.

Figure 10B:
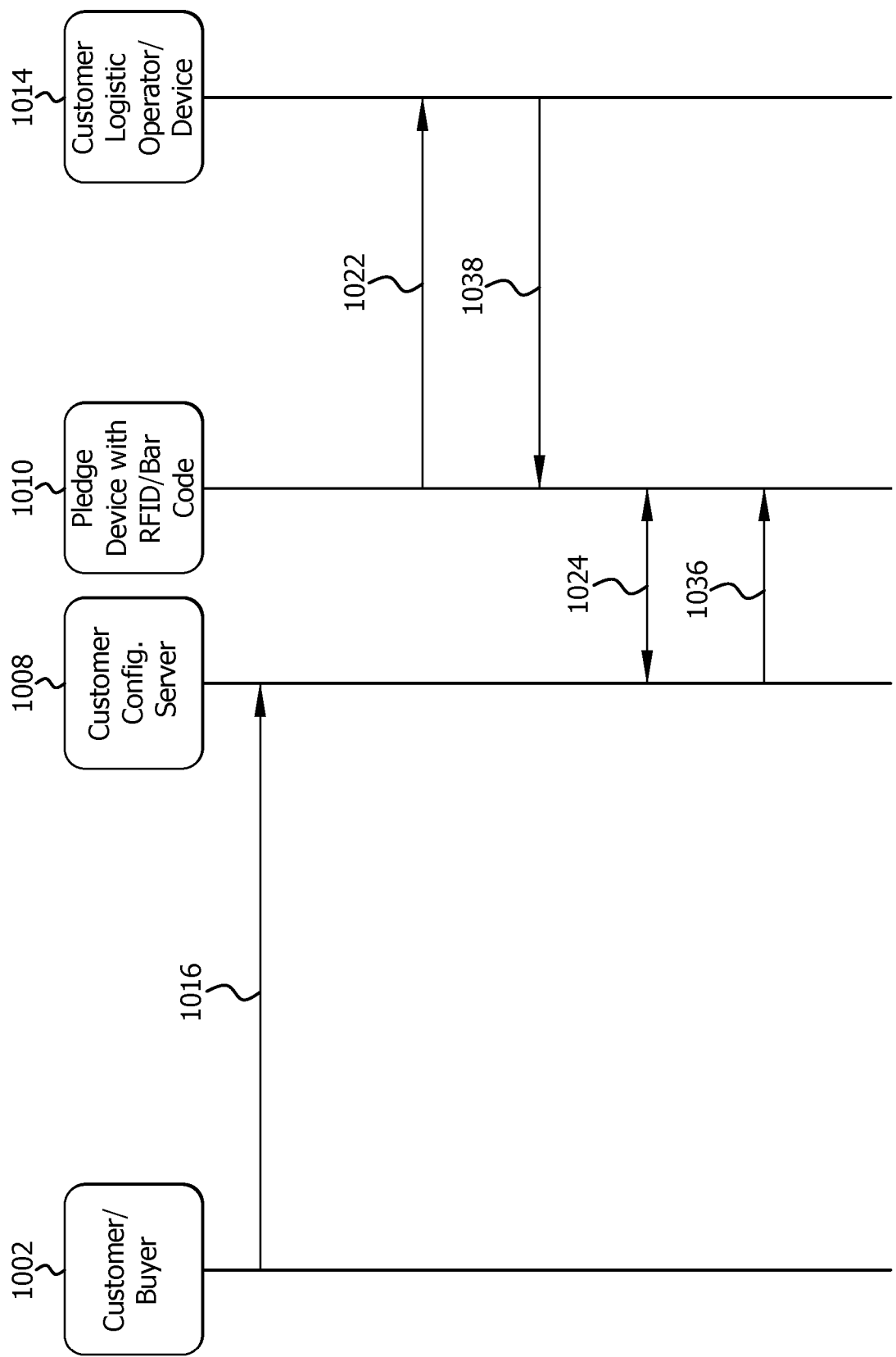
FIG. 10B illustrates a communication flow operable to provision a secure device from a customer perspective according to another exemplary embodiments of the disclosure.

FIG. 10B illustrates another communication flow according to another exemplary embodiment of the disclosure. The communication flow of FIG. 10B is substantially similar to the communication flow of FIG. 10A, except where differences are noted below. The communication flow of FIG. 10B relates to pledge devices that incorporate an RFID chip that is readable by a CPU of the pledge device 1010. At step 1016, the customer CCA-based credentials are provided to the customer configuration server 1008. In this embodiment, when a new pledge device is received by the customer from the vendor, the customer reads a barcode or RFID chip on the pledge device with a customer logistics device 1014, at step 1022. When the customer uses logistics device 1014 to receive the pledge device 1010, the logistics device 1014 sends the receive voucher to the Pledge Device 1010 at step 1038. In this embodiment the pledge device 1010 may be powered off until step 1036, at which point the pledge is powered on, possibly for the first time. During step 1036, the pledge device 1010 CPU reads the voucher from the RFID chip 1012. Steps 1024 and 1034 are substantially unchanged.

Figure 10C:
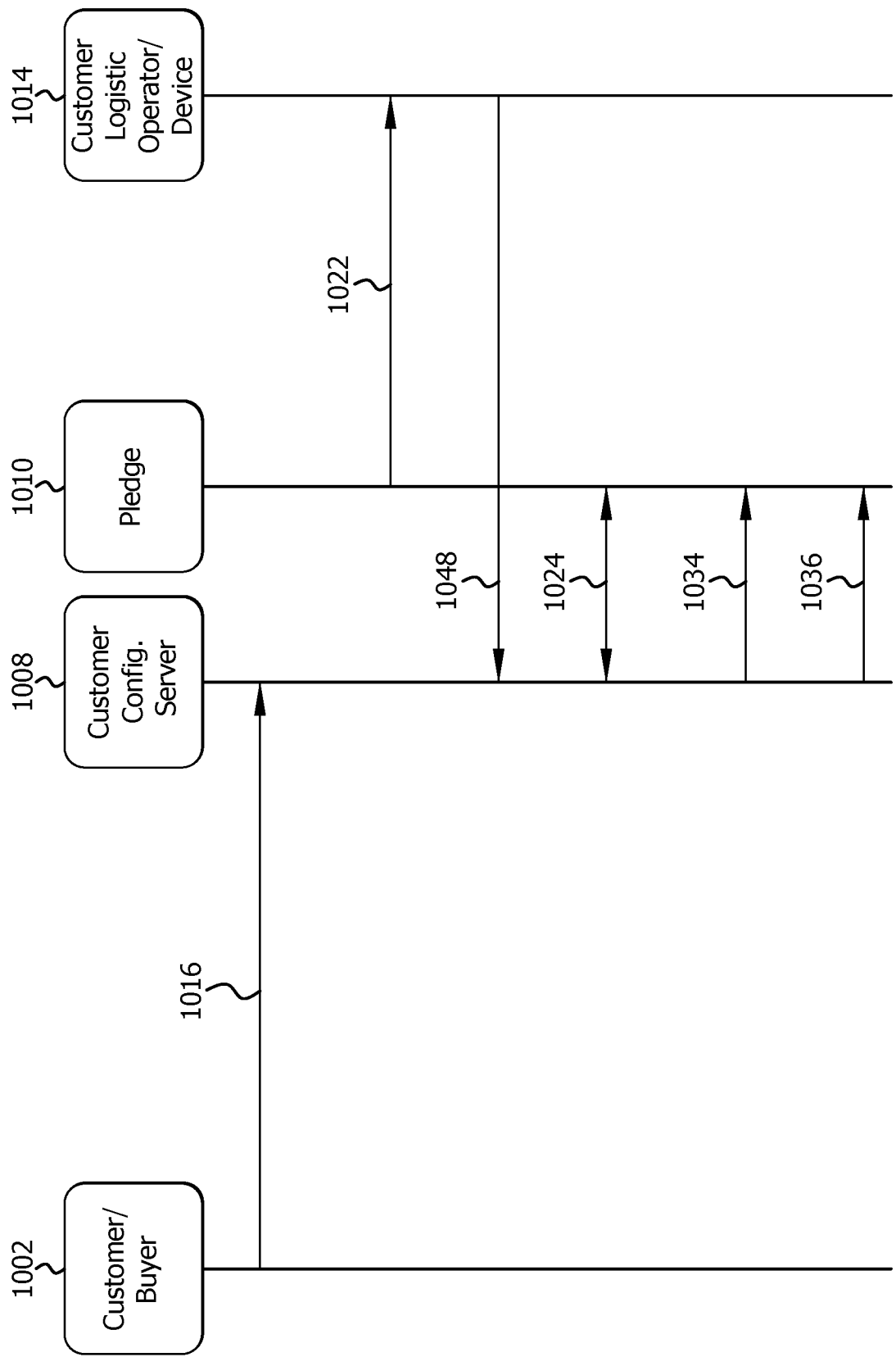
FIG. 10C illustrates a communication flow operable to provision a secure device from a customer perspective according to yet another exemplary embodiments of the disclosure.

FIG. 10C illustrates another communication flow according to an embodiment in which the pledge device includes an RFID chip, possibly incorporated in the pledge device 1010, or attached to the packaging of the pledge device. In this embodiment, when the customer uses logistics device 1014 to receive the pledge device 1010, the logistics device 1014 sends the receive voucher to the configuration server 1008 at step 1048. The remaining steps are substantially the same, and the pledge device 1010 is configured by the customer configuration server 1008.

It will be understood by one skilled in the art that this disclosure is not limited in its application to the details of construction and the arrangement of components set forth in the following description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments of the present invention can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the present invention can be easily construed as within the scope of the invention by programmers skilled in the art to which the present invention pertains. Method steps associated with the illustrative embodiments of the present invention can be performed by one or more programmable processors executing a computer program, code or instructions to perform functions (e.g., by operating on input data and/or generating an output). Method steps can also be performed by, and apparatus of the invention can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general purpose processor, a digital signal processor (DSP), an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. A software module may reside in random access memory (RAM), flash memory, ROM, EPROM, EEPROM, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. In other words, the processor and the storage medium may reside in an integrated circuit or be implemented as discrete components.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A method of provisioning secure pledge devices, comprising:
    sending a request to a voucher server, the request including customer identification;
    receiving a voucher generated by the voucher server in response to the request, wherein the voucher includes logistics information based on the customer identification and identifying information of a pledge device; and
    writing the voucher to a Radio Frequency Identifier (RFID) chip associated with the pledge device, wherein the voucher is stored in the RFID chip of the pledge device and authenticates the pledge device to thereby provision the pledge device identified by the identifying information to operate on a network of the customer that is identifiable using the customer identification without requiring a connection outside of the network of the customer.

2. The method of claim 1, further comprising receiving logistics information associated with the pledge device from a logistics server, and writing the logistics information to the RFID chip.

3. The method of claim 2, wherein the logistics information comprises at least one of a crypto anchor (CA), a customer ID or a pledge serial number.

4. The method of claim 3, wherein the voucher is generated using a customer root certificate.

5. The method of claim 1, wherein the RFID chip is embedded in the pledge device.

6. The method of claim 1, wherein the RFID chip is provided on packaging of the pledge device.

7. The method of claim 1, wherein the pledge device is powered off while writing the voucher to the RFID chip.

8. The method of claim 1, wherein the pledge device is packaged for shipment to a customer while writing the voucher to the RFID chip.

9. A non-transitory computer-readable medium storing computer instructions for provisioning secure pledge devices, that when executed by one or more processors, cause the one or more processors to perform the steps of:
    sending a request to a voucher server, the request including customer identification;
    receiving a voucher generated by the voucher server in response to the request, wherein the voucher includes logistics information based on the customer identification and identifying information of a pledge device; and
    writing the voucher to a Radio Frequency Identifier (RFID) chip associated with the pledge device, wherein the voucher is stored in the RFID chip of the pledge device and authenticates the pledge device to thereby provision the pledge device identified by the identifying information to operate on a network of the customer that is identifiable using the customer identification without requiring a connection outside of the network of the customer.

10. The non-transitory computer-readable medium of claim 9, causing the one or more processors to further perform the step of receiving logistics information associated with the pledge device from a logistics server, and writing the logistics information to the RFID chip.

11. The non-transitory computer-readable medium of claim 10, wherein the logistics information comprises at least one of a crypto anchor (CA), a customer ID or a pledge serial number.

12. The non-transitory computer-readable medium of claim 11, wherein the voucher is generated using a customer root certificate.

13. The non-transitory computer-readable medium of claim 9, wherein the RFID chip is embedded in the pledge device.

14. The non-transitory computer-readable medium of claim 9, wherein the RFID chip is provided on packaging of the pledge device.

15. The non-transitory computer-readable medium of claim 9, wherein the pledge device is powered off while writing the voucher to the RFID chip.

16. The non-transitory computer-readable medium of claim 9, wherein the pledge device is packaged for shipment to a customer while writing the voucher to the RFID chip.

* * * * *

UNITED STATES PATENT AND TRADEMARK OFFICE
CERTIFICATE OF CORRECTION

| | |
|---|---|
| PATENT NO. | : 10,762,590 B2 |
| APPLICATION NO. | : 15/902522 |
| DATED | : September 1, 2020 |
| INVENTOR(S) | : Eckert |

It is certified that error appears in the above-identified patent and that said Letters Patent is hereby corrected as shown below:

On the Title Page

• Column 2, Line 3 of the Abstract: please replace "a vouchers" with --a voucher--

Signed and Sealed this
Twenty-fourth Day of May, 2022

Katherine Kelly Vidal
*Director of the United States Patent and Trademark Office*